United States Patent [19]

Holubka

[11] Patent Number: 4,463,143

[45] Date of Patent: Jul. 31, 1984

[54] DIBLOCKED DIISOCYANATE UREA URETHANE OLIGOMERS AND COATING COMPOSITIONS COMPRISING SAME

[75] Inventor: Joseph W. Holubka, Livonia, Mich.

[73] Assignee: Ford Motor Company, Dearborn, Mich.

[21] Appl. No.: 472,800

[22] Filed: Apr. 11, 1983

Related U.S. Application Data

[62] Division of Ser. No. 334,794, Dec. 28, 1981, Pat. No. 4,409,381.

[51] Int. Cl.$^3$ .................... C08L 63/00; C08G 18/32; C08G 18/80
[52] U.S. Cl. .................... 525/528; 525/454; 528/45
[58] Field of Search ................ 528/45; 525/454, 528

[56] References Cited

U.S. PATENT DOCUMENTS

| | | | |
|---|---|---|---|
| 2,511,544 | 6/1950 | Rinke et al. | 528/85 |
| 3,245,961 | 4/1966 | Feischer et al. | 528/45 |
| 3,779,994 | 12/1973 | Wood | 528/71 |
| 3,931,115 | 1/1976 | Strassel | 528/64 |
| 3,931,116 | 1/1976 | Bernstein et al. | 528/49 |
| 3,933,759 | 1/1976 | Hoeschele | 528/45 |
| 3,939,126 | 2/1976 | Carder et al. | 528/75 |
| 4,036,906 | 7/1977 | Finelli | 528/61 |
| 4,089,844 | 5/1978 | Tsou | 528/45 |
| 4,134,865 | 1/1979 | Tominaga | 528/45 |
| 4,284,572 | 8/1981 | Stanley | 528/45 |
| 4,294,940 | 10/1981 | Hino | 528/45 |
| 4,315,840 | 2/1982 | Kempter | 528/45 |

*Primary Examiner*—Paul Lieberman
*Attorney, Agent, or Firm*—Peter D. McDermott; Roger L. May

[57] ABSTRACT

This invention provides novel resin systems and high solids, solvent-based chain-extendable, self-crosslinking coating compositions comprising same. The resin systems comprises novel diblocked diisocyanate urea urethane oligomers of molecular weight about 300 to 5000. The resin system further comprises a polyepoxide, preferably a diepoxide, of molecular weight about 100 to 1000 used generally with said oligomer in weight ratio of about 1:1 to about 1:10, respectively. The resin components provide chain-extension polymerization during cure at elevated temperature, in situ, on the surface of a substrate. The resin system is also self-crosslinking. That is, no additional crosslinking component is required to cure the composition. The cured coatings of the invention provide greatly improved physical properties, in particular, greatly improved corrosion resistance.

20 Claims, No Drawings

DIBLOCKED DIISOCYANATE UREA URETHANE OLIGOMERS AND COATING COMPOSITIONS COMPRISING SAME

This is a division of application Ser. No. 334,794, filed Dec. 28, 1981, now U.S. Pat. No. 4,409,381.

INTRODUCTION

This invention relates to novel resin systems and to high solids, solvent based coating compositions comprising same. A first component comprises any of certain novel chain-extendable, crosslinkable primary and secondary alcohol diblocked diisocyanate urea urethane oligomers. The second comprises polyepoxide. The resin components provide chain-extension polymerization during cure at elevated temperature, in situ, on the surface of a substrate. The resin system is self-crosslinking, that is, no additional crosslinking agent is required. The cured coatings of the invention are highly humidity and solvent resistant and provide exceptional corrosion resistance.

RELATED APPLICATIONS

This application is related to concurrently filed application Ser. No. 334,792, now U.S. Pat. No. 4,423,171 entitled Novel Diblocked Diisocyanate Diurea Oligomers and Coating Compositions Comprising Same; Ser. No. 334,793, now U.S. Pat. No. 4,409,380 entitled Novel Tertiary Alcohol-Diblocked Diisocyanate Diurea Oligomers and Coating Compositions Comprising Same and Ser. No. 334,842, now U.S. Pat. No. 4,396,753, entitled Novel Tertiary Alcohol-Diblocked Diisocyanate Urea Urethane Oligomers and Coating Compositions Comprising Same.

BACKGROUND OF THE INVENTION

Solvent based coating compositions are known which employ high molecular weight (e.g. 2,000 to 10,000) polymer resins having crosslinking functionality, and a suitable crosslinking agent. Typically, such coating compositions are applied to a substrate, for example, by spraying, and are then cured by baking the coated substrate at an elevated temperature suitable to drive off the organic solvent and to promote the crosslinking reaction. The resulting thermoset coating, if sufficiently humidity, solvent and corrosion resistant, can provide aesthetic and functional advantages including corrosion protection for the underlying substrate.

Coating compositions comprising such high molecular weight polymer resins typically comprise only 25% to 50% solids so as to be sprayable or otherwise conveniently applicable to a substrate. The viscosity of coating compositions of higher solids content is typically too high for this purpose. Conventional epoxy ester based automotive vehicle spray primers, for example, typically have a volatile organic content ("VOC") of approximately 540 g/l.

Elimination of the volatile organic solvent portion during curing of these conventional low-solids coating compositions presents toxicity and in some cases flammability hazards. Furthermore, bulk volume of these coating compositions is relatively large and therefore presents undesirable material handling difficulties, and added expense. Furthermore, excessive solvent losses and/or solvent recovery equipment add considerable expense to the coating operation. Recently, governmental regulations on hydrocarbon emissions, particularly applicable to automotive coating operations, mandate a significant reduction in volatile organic content for coating compositions. Thus, for example, guidelines for 1982 presently require that emissions of volatile organics from automotive vehicle primer coating compositions be reduced to that equivalent to using coating compositions of no greater than 350 g/l (2.9 lb./gal.) VOC. To meet government guidelines, coating compositions of VOC greater than 350 g/l can be employed in conjunction with emissions treatment equipment to achieve the specified emissions limit. Such treatment equipment presents significant additional expense, however, and thus there is a great need to provide coating compositions of VOC reduced near to or preferably even lower than, the 350 g/l governmental limit.

In response to these concerns, high solids coating compositions have been suggested which, typically, employ low molecular weight multi-functional adducts or copolymers in combination with multi-functional crosslinking agents. These high solids coating compositions are less viscous and, therefore, can be applied by spraying, for example, with far lower VOC than was possible with conventional epoxy ester based coating compositions or other conventional coating compositions comprising high molecular weight polymer resins. After application to the substrate, high solids coating compositions are cured by baking at a cure temperature, that is, at an elevated temperature suitable to drive off the volatile organic content and to promote polymerization and crosslinking of the multi-functional low molecular weight component(s).

Typically, high solids coating compositions yield cured coatings having polymeric networks that differ significantly in structure and morphology from the polymeric networks provided by conventional, low solids coating compositions comprising high molecular weight polymers. Consequently, the physical properties of the coatings provided by such high solids coatings compositions can differ significantly from those of the cured coatings provided by the conventional, low solids coating compositions. In particular, the cured coatings obtained from known high solids coating compositions can be inferior in that they can be less flexible, less solvent resistant, less adherent to the substrate and/or for other reasons provide less corrosion inhibition for the underlying substrates. Accordingly, it would be highly desirable to provide a coating composition comprising low molecular weight materials suitable for use in high solids, solvent based coating compositions and yet which, upon curing, form coatings having physical properties, particularly corrosion resistance, comparable to or better than the physical properties of coatings obtained from conventional low solids solvent based coating compositions.

Accordingly, it is an object of the present invention to provide novel resin compositions suitable for use in high solids, solvent-based coating compositions. In this regard, it is a particular object of the invention to provide novel coating compositions which are curable by chain-extension and crosslinking during cure, in situ, on the surface of a substrate to form polymeric coatings similar in properties to those obtainable through use of conventional low solids, solvent-based coating compositions.

It is a particular object of the invention to provide a coating composition of sufficiently low VOC to facilitate compliance with governmental guidelines. It is also an object of the invention to provide such a coating composition which can be applied to a substrate by spraying or other known method.

It is another object of the invention to provide a method of making a coating on a substrate, which coating has advantageous physical properties including humidity, solvent and corrosion resistance. Additional aspects and advantages of the invention will be apparent from the following description thereof.

SUMMARY OF THE INVENTION

According to the present invention, low molecular weight chain-extendable, crosslinkable diblocked diisocyanate urea urethane oligomers are provided which are suitable for use in high solids, organic solvent based coating compositions. The novel oligomers of the invention are the reaction product of primary or secondary alkanolamine with half-blocked diisocyanate, and have a number average molecular weight preferably about 300 to about 5000, more preferably about 300 to about 1500. The half-blocked diisocyanate is the reaction product of organic diisocyanate with monofunctional blocking agent.

According to another aspect of the invention, a novel solvent-based resin composition comprises the novel chain-extendable, crosslinkable diblocked diisocyanate urea urethane oligomer of the invention, polyepoxide bearing preferably about 2 to 10, more preferably about 2 to 4 epoxide groups, and having molecular weight of about 100 to 1000, more preferably about 300 to 700, and suitable organic solvent. The resin composition comprises latent chain-extension polymerization functionality and undergoes chain-extension polymerization, in situ, on the surface of the substrate during cure of the coating to form high molecular weight polyurea polyurethanes. More specifically, the primary and secondary alcohol-blocked isocyanate groups of the novel oligomers of the invention undergo thermal de-blocking at elevated temperature between about 120° and 250°, and then react with the epoxy functionality of the polyepoxide forming a polymer bearing oxazolidone linkages. The resin composition further comprises latent self-crosslinking functionality. That is, the de-blocked isocyanate functionality is also reactive with the N-hydrogen functionality of the urea and urethane moieties of the chain-extended polyurea polyurethane which is formed during cure of the coating composition. Thus, during cure of the coating composition, in situ, on the surface of the substrate, each blocked isocyanate group is de-blocked and will undergo chain-extension reaction with an epoxy group of the polyepoxide component of the coating composition or will undergo crosslinking reaction with a urea or urethane moiety of the chain-extended polymerization reaction product forming during cure. If the polyepoxide is a diepoxide, then the resin composition of the invention will undergo substantially linear chain-extension polymerization. If the polyepoxide bears three or more epoxide groups, epoxy/isocyanate reaction will provide not only chain-extension polymerization but also an additional mode of crosslinking in the cured coating. Thus, the degree of crosslinking in the cured coating can be controlled, in part, by the selection of the polyepoxide employed in the coating composition. Accordingly, the novel resin composition of the invention is curable to form a coating, in situ, on the surface of a substrate, employing both a chain-extension polymerization reaction and separate and distinct crosslinking reactions.

The resin composition of the invention can be formulated into high solids coating compositions having a viscosity as low as about 25–40 seconds, #4 Ford Cup or less, at 27° C. at calculated VOC of 350 to 400 g/l or less.

According to another aspect of the invention, a method of making a corrosion, solvent and humidity resistant coating on a substrate comprises applying to the substrate the novel thermosetting resin composition of the invention and heating the resin composition to between about 120° C. and about 250° C. and preferably to between about 150° C. and about 220° C. for a period sufficient to yield a cured coating. The cured coating, which is yet another aspect of the invention, is solvent and humidity resistant and has been found to provide exceptionally good corrosion resistance.

DETAILED DESCRIPTION OF THE INVENTION

As used herein, a high solids coating composition is one comprising polymerizable resin in which a volatile organic solvent content of about 400 g/l (3.4 lb./gal.) or less yields a viscosity of less than approximately 40 sec. #4 Ford Cup at 27° C. (80° F.). Thus, such high solids coating composition could be applied, for example, by spray techniques to a substrate.

The novel crosslinkable, chain-extendable diblocked diisocyanate urea urethane oligomer component of the invention preferably has a number average molecular weight about 300 to about 5000, more preferably about 300 to about 1500. These oligomers are provided as the reaction product of a suitable primary or secondary alkanolamine with suitable half-blocked diisocyanate. The hydroxy functionality and the amine functionality of the alkanolamine each react with the free isocyanate functionality of a different half-blocked diisocyanate molecule forming a urethane linkage and a urea linkage, respectively. The reaction product comprises two blocked isocyanate groups, one from each of the two half-blocked diisocyanate molecules which reacted with the alkanolamine. The alkanolamine and half-blocked diisocyanate are reacted together according to methods which are well known to the skilled of the art.

Suitable alkanolamines include primary and secondary alkanolamines of molecular weight about 60 to about 700, more preferably about 60 to about 300. Many suitable alkanolamines are readily commercially available and will be apparent to the skilled of the art in view of the present disclosure. Preferred alkanolamines include, for example, primary alkanolamines of 2 to 20 carbons, for example, ethanolamine, 2-aminopropanol, 3-aminopropanol, etc. and secondary alkanolamines, for example, N-alkylalkanolamine, wherein each alkyl moiety and each alkanol moiety has about from 2 to 20 carbons, for example, N-methylethanolamine, N-ethylethanolamine, N-propylbutanolamine and the like and a mixture of any of them. Where a high solids coating composition is desired, it is generally preferred to use primary and/or secondary alkanolamines wherein each alkyl moiety and each alkanol moiety has only about 2 to about 6 carbons, since the resulting oligomers of the invention are of lower molecular weight and provide a coating composition of lower viscosity at a given VOC. Where greater flexibility is desired in the cured coating, it is preferred to use alkanolamines and/or N-alkylalkanolamines having longer chain alkyl moieties, for example, 6 carbon to 20 carbon chains.

It should be recognized that employing a secondary alkanolamine provides a diblocked diisocyanate urea urethane oligomer which provides one fewer active hydrogen for crosslinking reaction during curing of the coating composition. That is, if secondary alkanolamine is employed to make an oligomer of the invention, such oligomer will have only two active hydrogens for crosslinking (one at the urea moiety and one at the urethane moiety), while if primary alkanolamine is employed, it will have three active hydrogens for crosslinking (two at the urea moiety and one at the urethane moiety). Accordingly, by selection of a suitable mixture of primry and secondary alkanolamine, the crosslink density in the cured coating and hence certain coating properties, e.g., flexibility, can be controlled to a large extent. Thus, for example, use of a larger portion of primary alkanolamine will yield a less flexible, higher crosslinking density cured coating.

Suitable half-blocked diisocyanates comprise the reaction product of a suitable organic diisocyanate in aproximately 1:1 molar ratio with suitable monofunctional blocking agent, and include those of number average molecular weight of about 120 to about 2000, preferably about 120 to about 600. Suitable organic diisocyanates are readily commercially available and will be apparent to the skilled of the art in view of the present disclosure. Suitable diisocyanates include aromatic diisocyanates, for example, phenylene diisocyanates, toluene diisocyanates, and aliphatic diisocyanates, for example, isophorone diisocyanates and diisocyanatoalkane wherein the alkyl moiety has preferably from about three to ten carbons, for example, 1,4-diisocyanatobutane, 1,6-diisocyanatohexane and the like or a compatible mixture of any of them. Most preferably the organic diisocyanate has a molecular weight less than about 250. If corrosion resistance is of primary concern in the cured coating, for example in the case of an automotive vehicle primer or topcoat, it may be preferred to use an aliphatic diisocyanate, for example, isophorone diisocyanate and 1,6-hexane diisocyanate. Aromatic diisocyanates provide suitable coatings, however, and may be preferred in view of their lower cost.

Suitable half-blocked diisocyanate is prepared by reaction of any suitable organic diisocyanate, as described above, with sufficient monofunctional blocking agent to block approximately one half of the isocyanate functionality. Accordingly, approximately one molar equivalent of monofunctional blocking agent is reacted with approximately one molar equivalent of the organic diisocyanate. Suitable techniques well known to the skilled of the art can be employed to maximize the yield of half-blocked diisocyanate, such as, for example, adding the blocking agent slowly to the organic diisocyanate under reaction conditions. The half-blocked diisocyanate is then reacted with the previously described alkanolamine in molar ratio of about 2:1, respectively, to produce the chain-extendable, crosslinkable diblocked diisocyanate urea urethane oligomer or the invention.

Suitable readily commercially available monofunctional blocking agents are well known to the skilled of the art. The blocking agent is selected such that the blocked isocyanate group will remain blocked for long periods of time at normal storage temperatures, but will be substantially totally "de-blocked" at elevated "cure" temperature. In addition, since the blocking agent will be released when the coating composition is cured by baking, it is preferred that the blocking agent have high volatility near its de-blocking temperature and so will diffuse rapidly through the coating composition and evaporate completely therefrom during the baking step. Any blocking agent allowed to remain in the cured coating should be inert to the cured coating and to the substrate and to any other coatings to be used in conjunction with it. It is within the skill of those skilled in the art to select a suitable blocking agent to provide a de-blocking temperature meeting the requirements of each particular application intended for a coating composition of the invention. It will typically be preferred that the blocked isocyanate functionality be de-blocked (i.e., that the coating composition be curable) at a temperature within the range of about 150° to 220° C. Accordingly, preferred monofunctional blocking agents are selected from the group comprising suitable amides, for example caprolactam, phenols ketoximes and lower alcohols for example primary and secondary alcohol of one to about eight carbons, for example methanol, ethanol, any propanol, any butanol, any pentanol, including cyclopentanol, and the like, or a mixture of any of them.

The novel solvent based resin compositions of the invention comprise the novel chain-extendable crosslinkable diblocked diisocyanate urea urethane oligomers of the invention and suitable polyepoxide. Preferred polyepoxides have from 2 to about 10 epoxide functionality, more preferably from 2 to about 4. Preferably the polyepoxide (or each of them) has a number average molecular weight between about 100 and 1000, and more preferably between about 300 and 700. Numerous suitable polyepoxides are readily commercially available and will be apparent to the skilled of the art in view of the present disclosure. Preferred polyepoxides include, for example, any of a wide variety of acyclic or cyclic aliphatic polyepoxides such as, for example, 1,4-butanediol diglycidyl ether, vinylcyclohexane diepoxide and Araldite Cy179 (trademark, Ciba-Geigy Corporation, Ardsley, N.Y.), and aromatic polyepoxides such as, for example, Bisphenol A epichlorohydrin epoxy resins and the like or a compatible mixture of any of them.

Preferred polyepoxides include terminal polyepoxides, that is, polyepoxides bearing two terminal epoxide groups, since these are generally more reactive and therefore provide coating compositions which cure faster and/or at lower temperature. Preferred polyepoxides include diepoxides. Most preferred in view of their commercial availability are, for example, acyclic or cyclic aliphatic diepoxides such as, for example, 1,4-butanediol diglycidyl ether and 4-vinylcyclohexene dioxide and aromatic diepoxides such as, for example, Bisphenol A epichlorohydrin epoxy resins, for example, Epon 828 (trademark) and other members of the Epon (trademark) series, Shell Chemical Company, Houston, Tex., and DER 331 and other members of the DER (trademark) series, Dow Chemical Company, Midland, Mich. Also preferred are cycloaliphatic diepoxy resins, for example, the Eponex (trademark) series of Shell Chemical Company, Houston, Tex., and hydantoin epoxy resins, for example, Resin XB2793 (trademark), Ciba-Geigy Corporation, Ardsley, N.Y. and epoxy novolak resins such as, for example, Epon 152 (trademark) and Epon 154 (trademark), Shell Chemical Company.

In general, of the above described diepoxides, the lower molecular weight diepoxides are preferred, for example Epon 828 (trademark), since a resin composition of correspondingly lower viscosity (or lower VOC) is provided. Other, higher molecular weight diepoxides, for example, higher molecular weight members of the Epon (trademark) series, are suitable for coating compositions of somewhat higher viscosity (or lower solids content).

Polyepoxide can be used in approximately stoichiometric amount in the coating composition. That is, the coating composition can comprise equal molar equivalents of polyepoxide and diblocked diisocyanate urea urethane oligomer. Such composition has been found to provide efficient chain-extension polymerization during cure of the coating composition. While there can be an excess of oligomer, there should not be an excess of polyepoxide, since unreacted epoxy functionality can adversely effect the humidity, solvent and corrosion resistance of the cured coating. Preferably the oligomer and polyepoxide are used in a weight ratio of 1:1 to about 10:1, respectively, and more preferably in a ratio of 1:1 to about 2:1.

While not wishing to be bound by theory, it is presently understood that, upon curing the coating composition, the polyepoxide and the de-blocked diisocyanate urea urethane oligomer undergo chain-extension reaction to form a polymer bearing oxazolidone ring linking moieties. The polyoxazolidone so formed is believed to crosslink through reaction of N-H functionality of urea and urethane moieties of the polymer with de-blocked isocyanate functionality of the oligomers to form ureylene linkages. The degree of crosslinking in the cured coating provided through this mode of crosslinking can be controlled by selection of the ratio of epoxide functionality to isocyanate functionality in the resin composition. The greater the excess of isocyanate functionality, the higher the crosslink density in the cured coating.

In addition to crosslinking by de-blocked isocyanate/urea N-hydrogen reaction, the polyepoxide can provide crosslinking in the cured coating. While a diepoxide which has undergone chain-extension reaction with a de-blocked isocyanate functionality of each of two oligomer molecules provides no additional epoxy functionality, a polyepoxide of three or more epoxide groups which has undergone chain-extension reaction with two de-blocked oligomer molecules can react with the de-blocked isocyanate of one or more additional oligomers and thereby provide an additional mode of crosslinking and thus a more highly crosslinked polymeric structure in the cured coating. Accordingly, in general, diepoxides are preferred over polyepoxides of 3 or more epoxide groups if greater flexibility is desired in the cured coating. It should be recognized, however, that higher homologs of the epoxy resins useful in the present invention often comprise hydroxy functionality in addition to the epoxy functionality. It is believed that de-blocked isocyanate functionality of the oligomer will react with such hydroxy functionality. This aspect of the invention provides significant advantages where more efficient crosslinking is desired.

It will be appreciated from the above, that network crosslink density can be controlled, and therefore the flexibility and other properties of the cured coating can to a large extent be controlled by selection of the polyepoxide and of the diblocked diisocyanate urea urethane oligomer used in the coating composition. Crosslink density increases and flexibility decreases as the epoxide eequivalent weight of the polyepoxide is reduced and-/or as the isocyanate equivalent weight of the diblocked diisocyanate urea urethane oligomer is reduced. Thus, it will be apparent to the skilled of the art in view of the present disclosure that the selection of the polyepoxide and the selection of the organic diisocyanate, blocking agent and alkanolamine reactants for preparing the diblocked diisocyanate urea urethane oligomer provides substantial control of the crosslink density in the cured coating. Thus, for example, if the polyepoxide used is diepoxide, there will be a lower crosslink density in the cured coating than if the polyepoxide used is of similar molecular weight but has three or more epoxy groups per molecule.

Sufficient solvent is used in the coating composition of the invention to reduce the viscosity of the coating composition to a level suitable for application to the substrate in the desired manner. The molecular weight of the polyepoxide and of the diblocked diisocyanate urea urethane oligomer will affect the volatile organic content of the coating composition at a desired viscosity. Where a high-solids coating composition is desired, preferably lower molecular weight components are employed, since this has been found to provide high-solids coating compositions which can be applied easily to a substrate by spray or other means in a coating composition having a calculated volatile organic content of as low as about 350 g/l to 400 g/l (2.9 lb./gal. to 3.4 lb./gal.) or less. More specifically, while conventional epoxy ester-type automotive spray-applied primer coating compositions are known to require a volatile organic content of about 540 g/l, the novel coating compositions of the present invention have been found to require as little as about 350 g/l to 400 g/l (2.9 lb./gal. to 3.4 lb./gal.) or less VOC (calculated) to provide a viscosity of less than about 40 sec., #4 Ford Cup at 27° C. (80° F.). Of course, the coating compositions of the invention need not be formulated as a "high solids" composition, but rather can have a higher VOC to provide a lower viscosity. It is generally preferred in automotive vehicle spray coating applications and the like, for example, that sufficient solvent be used to provide a viscosity of about 15 to 40 sec., #4 Ford Cup at 27° C. (80° F.).

It will be within the skill of the art to determine the proper volatile organic content for a given coating composition of the invention for a given application. In general, suitable solvents include, for example, Cellosolve (trademark), Butyl Cellosolve (trademark), Butyl Cellosolve Acetate (trademark), Hexyl Cellosolve (trademark), Hexyl Cellosolve Acetate (trademark), Proposol P (trademark), Proposol B (trademark), Propsol M (trademark), all of Union Carbide Corporation, New York, N.Y., butanol, methyl amyl ketone, methyl ethyl ketone and the like, or a compatible mixture of any of them. Additional suitable solvents will be apparent to the skilled of the art in view of the present disclosure.

Any solvent allowed to remain in the cured coating should be inert so as to avoid adverse effect upon the cured coating or upon another coating used in conjunction with it during the curing process or thereafter. Preferably the cured coating is completely free of solvent. The preferred solvents, in addition, have relatively low volatility at temperatures appreciably below their boiling point such that solvent evaporation is low during storage and/or application of the coating composition to the substrate.

Also preferably included in the coating composition of the invention is any of a variety of commercially available catalysts which, in view of the present disclosure, will be apparent to the skilled of the art to be suitable to catalyze the chain-extension polymerization reaction between epoxide and de-blocked isocyanate functionality. Suitable catalysts include, for example, alkoxy bases, for example, sodium phenoxide, sodium methoxide, sodium butoxide, and tertiary amines, for example, hexamethylene triamine, and the like or a compatible mixture of any of them. Some catalyst may however reduce the stability of the coating composition. In addition, any of a variety of catalysts for the isocyanate de-blocking reaction can also be included in the coating composition, for example, dibutyl tin dilaurate. Also suitable as catalysts are Anchor 1040 (trademark) and Anchor 1115 (trademark) available from PVO International Corporation, San Francisco, Calif., which comprise amine blocked boron trifluoride and which have been found to catalyze the isocyanate de-blocking reaction. However, it should be recognized that amine catalyst should generally not be employed together with acid catalysts.

In addition, flow control agent, for example, polybutyl acrylate; wetting agent, for example, silicone; pigments; pigment dispersents, corrosion inhibitors, for example, chromate pigments, numerous of all of which are known to the skilled of the art, may be employed in the coating compositions of the invention.

According to another aspect of the invention, a coating on a substrate is provided, which coating comprises the chain-extended, crosslinked polymer product following cure of a coating comprising the resin system of the invention. The coating composition can be a low solids composition, that is, it can have a high VOC, but generally a high solids composition, that is, one having a low VOC, is preferred for the reasons given above. It can be applied by any conventional method, including brushing, dipping, flow coating, spraying, etc. Spraying will generally be preferred, for example, for applying the composition as an automotive vehicle body primer or topcoat. In such spraying applications, the coating compositions of the invention are especially advantageous for use as high solids compositions.

Curing the coating composition requires baking for sufficient time at sufficiently elevated temperature to de-block the blocked isocyanate functionality of the diblocked diisocyanate urea urethane oligomers and to promote the subsequent chain-extension and crosslinking reactions. The time and temperature required to cure the coating are interrelated and depend, in part, upon the particular diblocked diisocyanate urea urethane oligomer, polyepoxide, solvent and other materials, if any, used in the coating composition and upon the relative proportion of each. Employing a volatile organic content of about 360 g/l and selected preferred components as described above, the required bake time and temperature is typically about 20 to 30 minutes at about 180° C. The temperature required for cure can be reduced to about 150° C. for 20 to 30 minutes by addition of suitable catalyst such as any of those described above or otherwise known to the skilled of the art, for example, dibutyl tin dilaurate and tertiary amine.

It is a significant advantage of the coating composition of the invention that is does not require the addition of crosslinking agent. Known high solids coating compositions employing melamine crosslinking agent, for example, are disadvantaged by the cost of same and are further disadvantaged by the problems associated with the possible evolution of formaldehyde during cure of such coating compositions. It is another advantage of the invention, notwithstanding that a crosslinking agent is not added to the coating composition of the invention, that the crosslink density can be easily controlled to a large extent. As indicated above, the molecular weight and carbon chain lengths of the polyepoxide and of the reactants for preparation of the diblocked diisocyanate urea urethane oligomers of the invention can be selected to provide the desired crosslink density in the cured coating. In addition, the ratio of primary to secondary alkanolamine reactant used to prepare the diblocked diisocyanate urea urethane oligomer affords control of the crosslink density in the cured coating. In addition, the number of epoxy groups per polyepoxide molecule affords control of the crosslink density in the cured coatings. In addition, the relative proportion of polyepoxide to oligomer can be selected to control crosslink density, since excess oligomer can provide crosslinking via the active hydrogen of the urea and urethane moieties of the polymer product of the chain-extension reaction.

High solids coating compositions according to the present invention have been found to afford cured coatings with good humidity and solvent resistance and with exceptionally good corrosion resistance. The corrosion resistance has been found to be comparable and even better than that of conventional epoxy ester based, low solids sprayable coating compositions. The significant reduction in volatile organic content provided by the high solids coating composition of the invention can be seen to present, therefore, a highly advantageous advance in the art. Thus, for example, cured coatings according to the invention have been found to provide excellent corrosion resistance when applied over a metallic substrate such as, for example, when applied as an automotive vehicle primer coat over bare sheet steel. While not wishing to bound by theory, the exceptional corrosion inhibition provided by the invention is believed to stem, in part, from the presence of C-N bonds both in the polyurea polyurethane chain-extension reaction product and in the ureylene crosslinking moieties. In addition, the absence of ester linkages in the cured coating is believed to improve corrosion resistance. Ester linkages are known to be attacked by hydroxide, a product of the metal corrosion process. In contrast, the carbon-nitrogen bonds of the cured coating of the invention are believed to be highly alkali resistant and thus highly resistant to degradation processes involving hydrolysis by cathodicly generated hydroxide, for example, hydroxide generated by the corrosion of a metal substrate. Thus, for example, automotive vehicle primers comprising the coating composition of the invention and having a calculated volatile organic content of 350-390 g/l, have been discovered to provide corrosion resistance far superior to that provided by typical low solids, e.g., greater than 500 g/l volatile organic content, epoxy ester-based primers.

In addition, the coatings have been found in short term tests to provide excellent adhesion to substrate, for example, to conversion coated (phosphated) steel such as that to which an automotive vehicle primer comprising a coating composition according to the invention would be applied.

As presently understood, chain-extension reaction by each of the two isocyanate groups of a diblocked diisocyanate urea urethane oligomer, which are de-blocked during cure of the coating composition, provides substantially linear chain-extension, in situ, on the surface of the substrate. De-blocked isocyanate functionality not undergoing chain-extension reaction is available for crosslinking reaction with active N-hydrogen at the urea and urethane functionality of the polyurea polyurethane forming by chain-extension reaction during curing. Accordingly, it is preferred that the blocked isocyanate groups and two of the epoxy of the polyepoxide each be an end group. Reactions between such epoxy end groups and de-blocked isocyanate end groups are believed to provide most efficient chain-extension during cure.

EXAMPLE I

Preparation of Half-blocked Diisocyanate

Ethanol, 9.07 g, was added to isophorone diisocyanate, 43.6 g, in methyl amyl ketone, 13.2 g with 0.2 g dibutyl tin dilaurate. The mixture was heated at 60°–80° C. for 2 hours. The resulting half-blocked aliphatic diisocyanate was cooled to room temperature and stored. The product was characterized by its infrared spectrum (after solvent evaporation) which showed a reduction of the isocyanate absorption at 2250 cm$^{-1}$ and the presence of an intense carbonyl absorption at 1710 cm$^{-1}$.

EXAMPLE II

Preparation of Diblocked Diisocyanate Urea Urethane Oligomer

Ethanolamine, 6.1 g, was added over a 5-10 minute period to half-blocked isophorone diisocyanate, 65.8 g, prepared according to Example I. During addition of the ethanolamine, the reaction mixture was maintained at a temperature of 90° C. After addition was completed, the reaction mixture was stirred for 3 hours, was then diluted with the glycol ether ester solvent Ektasolve E.P. (trademark, Eastman Kodak Company, Rochester, N.Y.), 20 g, and was then stored. The product oligomer was characterized by its infrared spectrum which showed a absence of the absorption at 2250 cm$^{-1}$, and the presence of urethane and urea carbonyl absorptions in the 1670-1710 cm$^{-1}$ region.

EXAMPLE III

Preparation of Coating Composition of the Invention

An automotive vehicle primer comprising a coating composition according to the invention was prepared by mixing a pigment package and a resin package, the following:

| Pigment Package | |
|---|---|
| Silica | 23.6 g |
| Barytes | 21.4 g |
| Carbon black | 0.3 g |
| Titanium dioxide | 5.8 g |
| Resin Package | |
| Diblocked diisocyanate urea urethane oligomer[1] | 30. g |
| Epon 828[2] | 20. g |
| Propasol B[3] | 36. g |
| Dibutyl tin dilaurate | .4 g |

[1]The oligomer was prepared as described in Example II.
[2]Epon 828 is a trademark of Shell Chemical Company, Houston, Texas, for Bisphenol A epichlorohydrin epoxy resin.
[3]Propasol B is a trademark of Union Carbide Company, New York, New York for organic solvent (n-butoxypropanol).

The pigment package was thoroughly dispersed into the binder package. The resulting composition is ready for use as an automotive primer. It has a calculated volatile organic content of about 370 g/l, and a viscosity of less than 40 sec., #4 Ford Cup, at 27° C.

EXAMPLE IV

Preparation of Cured Coating

The coating composition of Example III was sprayed on Parker cold rolled, base, unpolished steel panels and baked at 180° C. for 30 minutes. The resulting cured coating has excellent solvent and humidity resistance and shows less than 1 mm adhesion loss after 24 hours salt spray exposure according to ASTM test method B117 using a Singleton SCCH Corrosion test cabinet operated at 35°±2° C.

EXAMPLE V

Preparation of Coating Composition of the Invention

An automotive vehicle primer comprising a coating composition of the invention is prepared by mixing a pigment package and a resin package as follows:

| Pigment Package | |
|---|---|
| Silica | 23.6 g |
| Barytes | 21.4 g |
| Carbon black | 0.3 g |
| Titanium dioxide | 5.8 g |
| Resin Package | |
| Diblocked diisocyanate urea urethane oligomer[1] | 30. g |
| Epon 1001[2] | 40. g |
| Propasol B[3] | 60. g |
| Dibutyl tin dilaurate | .4 g |

[1]Prepared as described in Example II.
[2]Epon 1001 is a trademark of Shell Chemical Company, Houston, Texas, for a Bisphenol A epichlorohydrin epoxy resin.
[3]Propasol B is a trademark of Union Carbide Corporation, New York, New York for organic solvent (n-butoxypropanol).

The pigment package is thoroughly dispersed into the binder package. The resulting composition is ready for use as an automotive primer. It has a calculated volatile organic content of about 370 g/l, and a viscosity of less than 40 sec., #4 Ford Cup, at 27° C.

EXAMPLE VI

Preparation of Cured Coating

The coating composition of Example V is sprayed on bare, unpolished steel panels and baked at 180° C. for 30 minutes. The resulting cured coating has excellent solvent and humidity resistance and shows less than 1 mm adhesion loss after 24 hours salt spray exposure according to ASTM test method B117 using a Singleton SCCH Corrosion test cabinet operated at 35°±2° C.

EXAMPLE VII

Preparation of Half-blocked Diisocyanate

Ethanol, 9.07 g is added to toluene diisocyanate, 34.2 g, in methyl amyl ketone, 10 g. Following addition of the alcohol, the reaction mixture is heated at 60°–80° C. for 2 hours. The resulting half-blocked aromatic diisocyanate is cooled to room temperature and stored. The product is characterized by its infrared spectrum (after solvent evaporation) which shows a reduction of the isocyanate absorption at 2250 cm$^{-1}$ and the presence of an intense carbonyl absorption at 1710 cm$^{-1}$.

EXAMPLE VIII

Preparation of Diblocked Diisocyanate Urea Urethane Oligomer

Ethanolamine, 6.1 g, is added over a 5-10 minute period to half-blocked isophorone diisocyanate, 53.3 g, prepared according to the method of Example VII. During addition of the ethanolamine, the reaction mixture is maintained at a temperature of 90° C. After addition is completed, the reaction mixture is stirred for 3 hours, diluted with the glycol ether ester solvent Ektasolve E.P. (trademark, Eastman Kodak Company, Rochester, N.Y.) 20. g, and then stored. The product oligomer is characterized by its infrared spectrum which shows the absence of the isocyanate absorption at 2250 cm$^{-1}$, and the presence of urethane and urea carbonyl absorptions in the 1670-1710 cm$^{-1}$ region.

EXAMPLE IX

Preparation of Coating Composition of the Invention

An automotive vehicle primer comprising a coating composition of the invention is prepared by mixing a pigment package and a resin package as follows:

| Pigment Package | |
| --- | --- |
| Silica | 23.6 g |
| Barytes | 21.4 g |
| Carbon black | 0.3 g |
| Titanium dioxide | 5.8 g |
| Resin Package | |
| Diblocked diisocyanate urea urethane oligomer[1] | 25. g |
| Epon 8282[2] | 20. g |
| Propasol B[3] | 36. g |
| Dibutyl tin dilaurate | .4 g |

[1]Prepared as described in Example II.
[2]Epon 828 is a trademark of Shell Chemical Company, Houston, Texas, for a Bisphenol A epichlorohydrin epoxy resin.
[3]Propasol B is a trademark of Union Carbide Company, New York, New York, for organic solvent (n-butoxypropanol).

The pigment package is thoroughly dispersed into the binder package. The resulting composition is ready for use as an automotive primer. It has a calculated volatile organic content of about 370 g/l, and a viscosity of less than 40 sec., #4 Ford Cup, at 27° C.

EXAMPLE X

Preparation of Cured Coating

The coating composition of Example IX is sprayed on bare, unpolished steel panels and baked at 180° C. for 30 minutes. The resulting cured coating has excellent solvent and humidity resistance and shows less than 1 mm adhesion loss after 24 hours salt spray exposure according to ASTM test method B117 using a Singleton SCCH Corrosion test cabinet operated at 35°±2° C.

EXAMPLE XI

Preparation of Half-blocked Diisocyanate

A solution of 148 g (2 moles) of n-butanol in 48 g of methyl amyl ketone was added to a solution of 444 g (2 moles) of isophorone diisocyanate in 100 g methyl amyl ketone maintained under an inert atmostphere of argon at a temperature of 80°-100° C. Addition time was about one hour. Higher temperatures and longer reaction times were avoided to prevent undesirable side reactions. After three hours the reaction was cooled to room temperature and stored for subsequent use. The product was characterized by its infrared spectrum (after solvent evaporation) which showed a reduction of the isocyanate absorption at 2250 cm$^{-1}$ and the presence of an intense carbonyl absorption at 1710 cm$^{-1}$.

EXAMPLE XII

To 30.5 g (0.5 mole) of ethanol amine and 10 g of dimethoxy ethane in a three neck flask equipped with an overhead stirrer was added over a one hour period, 370 g (1.0 mole) of butanol half blocked diisocyanate prepared as described in Example XI. During the addition, the reaction temperature rose to about 60° C. After the addition the reaction was stirred overnight at room temperature. The product oligomer was characterized by its infrared spectrum which showed the absence of isocyanate absorption at 2250 cm$^{-1}$, and the presence of urethane and urea carbonly absorption in the 1670-1710 cm$^{-1}$ region.

Particular embodiments of the present invention described above are illustrative only and do not limit the scope of the invention. It will be apparent to the skilled of the art in view of the foregoing disclosure that modifications and substitutions can be made without departing from the scope of the invention.

We claim:

1. A solvent based resin composition comprising:
   A. a chain-extendable, crosslinkable diblocked diisocyanate urea urethane oligomer of molecular weight about 300 to about 5000 comprising the reaction product of primary or secondary alkanolamine of molecular weight about 60 to about 700 with half-blocked diisocyanate of molecular weight about 120 to about 2000, in molar ratio of about 1:2, respectively, whereby both the hydroxy and amine functionality react with free isocyanate groups to form urethane and urea linkages respectively, said oligomer being substantially free of unreacted hydroxy and amino functionality, which half-blocked diisocyanate is the reaction product of organic diisocyanate with monofunctional blocking agent, wherein said diblocked diisocyanate urea urethane oligomer has a de-blocking temperature of about 120° C. to about 250° C.;
   B. polyepoxide bearing about 2 to about 10 epoxide groups and having molecular weight of about 100 to about 1000, wherein said oligomer and said polyepoxide are present in a weight ratio of from about 1:1 to about 10:1, respectively; and
   C. organic solvent.

2. The resin composition of claim 1, wherein said diblocked diisocyanate urea urethane oligomer has a de-blocking temperature of about 150° C. to about 220° C.

3. The resin composition of claim 1, wherein said diblocked diisocyanate urea urethane oligomer has a number average molecular weight of from about 500 to about 1500.

4. The resin composition of claim 1, wherein said alkanolamine is selected from the group consisting of primary alkanolamines, wherein the alkyl moiety has about 1 to about 10 carbons, secondary alkanolamines selected from N-alkylakanolamine, wherein each alkyl moiety has about from 1 to 10 carbons and a mixture of any of them.

5. The resin composition of claim 1, wherein said organic diisocyanate is selected from the group consisting of phenylene diisocyanate, toluene diisocyanate isophorone diisocyanate, diisocyanatoalkane, wherein the alkyl moiety has from about three to about ten carbons, and a mixture of any of them.

6. The resin composition of claim 1, wherein said monofunctional blocking agent is selected from the group consisting of primary alcohol, secondary alcohol, amide, phenol, ketoxime and a mixture of any of them.

7. The resin composition of claim 1, wherein said blocking agent is alcohol of one of about eight carbons.

8. The resin composition of claim 7, wherein said monofunctional blocking agent is butanol.

9. The resins composition of claim 1, wherein said polyepoxide comprises two terminal epoxide groups.

10. The resin composition of claim 1, wherein said polyepoxide consists of diepoxide.

11. The resin composition of claim 10, wherein said diepoxide is selected from the group consisting of Bisphenol A epichlorohydrin epoxy resins, hydantoin epoxy resins, epoxy novolak resins and cyclic or acylic aliphatic diepoxide or a mixture of any of them.

12. The resin composition of claim 1, wherein said solvent is butanol.

13. The resin composition of claim 1, wherein said oligomer and polyepoxide are of such viscosity that a solution of about 350 g/l or less VOC has viscosity of less than about 40 sec., #4 Ford Cup at 27° C.

14. The resin composition of claim 1 further comprising catalyst for the isocyanate de-blocking reaction.

15. The composition of claim 14, wherein said catalyst is dibutyl tin dilaurate.

16. The resin composition of claim 1 further comprising catalyst for chain-extension epoxide/isocyanate reaction.

17. The resin composition of claim 16, wherein said chain-extension reaction catalyst is selected from the group consisting of alkoxy bases, tertiary amine and a mixture of any of them.

18. A solvent based resin composition comprising:

A. a chain-extendable, crosslinkable diblocked diisocyanate urea urethane oligomer of number average molecular weight about 300 to about 1500 comprising the reaction product of primary or secondary alkanolamine of molecular weight about 60 to 300 with half-blocked organic diisocyanate in molar ratio of about 1:2, respectively, whereby both the hydroxy and amine functionality react with free isocyanate groups to form urethane and urea linkages respectively, said oligomer being substantially free of unreacted hydroxy and amino functionality, said half-blocked diisocyanate having number average molecular weight of about 120 to about 600 and comprising the reaction product of the organic diisocyanate of molecular weight less than about 250, with an approximately equal molar amount of monofunctional blocking agent selected from the group consisting of primary alcohol, secondary alcohol, amide, phenol, ketoxime and a mixture of any of them, wherein said diblocked diisocyanate urea urethane oligomer has a de-blocking temperature of about 150° C. to about 220° C.;

B. Bisphenol A epichlorohydrin epoxy resin of epoxide equivalent weight about 180 to about 200, wherein said oligomer and said epoxy resin are present in weight ratio of about 1:1 to about 2:1, respectively; and C. organic solvent in amount sufficient to provide a volatile organic content (calculated) of less than about 400 g/l.

19. The resin composition of claim 18, wherein said organic diisocyanate is selected from the group consisting of toluene diisocyanate, phenylene diisocyanate, isophorone diisocyanate, diisocyantoalkane wherein the alkyl moiety has from about 3 to about 10 carbon and a mixture of any of them.

20. The solvent based resin composition of claim 18, wherein said alkanolaimine is ethanolamine.

* * * * *